United States Patent
Haba (10) Patent No.: US 8,995,472 B2
(45) Date of Patent: *Mar. 31, 2015

(54) CLOCK SYNCHRONIZATION USING CORRELATION EVENTS

(71) Applicant: Microsoft Corporation, Redmond, WA (US)

(72) Inventor: Erez Haba, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/153,873

(22) Filed: Jan. 13, 2014

(65) Prior Publication Data

US 2014/0173138 A1 Jun. 19, 2014

Related U.S. Application Data (63) Continuation of application No. 12/142,748, filed on Jun. 19, 2008, now Pat. No. 8,630,316.

(51) Int. Cl.

| | |
|---|---|
| G06F 15/16 | (2006.01) |
| G06F 1/12 | (2006.01) |
| H04J 3/06 | (2006.01) |
| H04L 12/26 | (2006.01) |
| H04N 21/242 | (2011.01) |
| H04L 12/24 | (2006.01) |

(52) U.S. Cl.
CPC ............... *G06F 1/12* (2013.01); *H04J 3/0661* (2013.01); *H04L 43/106* (2013.01); *H04N 21/242* (2013.01); *H04L 41/142* (2013.01)
USPC .......................................... 370/510; 709/246

(58) Field of Classification Search
USPC ......... 370/250, 254, 401, 503, 510, 513, 514; 709/201, 212–216, 230, 246, 250
See application file for complete search history.

(56) References Cited

U.S. PATENT DOCUMENTS

| | | | |
|---|---|---|---|
| 4,677,614 | A | 6/1987 | Circo |
| 5,361,277 | A | 11/1994 | Grover |
| 5,535,193 | A | 7/1996 | Zhang et al. |
| 5,774,377 | A | 6/1998 | Eidson et al. |
| 5,867,564 | A | 2/1999 | Bhusri |
| 2002/0181633 | A1 | 12/2002 | Trans |
| 2003/0110296 | A1 | 6/2003 | Kirsch et al. |
| 2003/0158706 | A1 | 8/2003 | Eidson |

(Continued)

OTHER PUBLICATIONS

Fober, et al., "Real Time Clock Skew Estimation over Network Delays", Technical Report, Jun. 2005, pp. 15.

(Continued)

*Primary Examiner* — Michael Thier
*Assistant Examiner* — Prince A Mensah
(74) *Attorney, Agent, or Firm* — Ben Tabor; Kate Drakos; Micky Minhas (57) ABSTRACT

Two clocks may be synchronized by calculating skew and offset values that may be determined from several correlation events. A correlation event may be the passing of messages in both directions between the two devices. The skew and offset values may be used to determine the time of non-correlated events. The clock synchronization may be performed on a real time basis or may be performed on a post processing basis. One method for calculating the skew and offset may use inequalities within a solution space to refine a solution set with multiple sets of correlation events.

20 Claims, 4 Drawing Sheets

(56) References Cited

U.S. PATENT DOCUMENTS

| | | |
|---|---|---|
| 2004/0105457 A1 | 6/2004 | Linares |
| 2005/0021708 A1 | 1/2005 | Raghuraman et al. |
| 2006/0149840 A1 | 7/2006 | Thompson et al. |
| 2007/0002987 A1 | 1/2007 | Sinha et al. |
| 2007/0230361 A1 | 10/2007 | Choudhury |
| 2008/0072221 A1 | 3/2008 | Chkodrov et al. |
| 2008/0151771 A1 | 6/2008 | Dowse |
| 2009/0059962 A1 | 3/2009 | Schmidt et al. |

OTHER PUBLICATIONS

Horauer, "Clock Synchronization in Distributed Systems", Dissertation at the Department of Computer Technology, University of Technology Vienna, Feb. 2004, pp. 128.

Ristenpart, et al., "Time Synchronization of Aggregated Heterogeneous Logs", 2004, pp. 23.

Sadler, Brian M., Local and Broadcast Clock Synchronization in a Sensor Node, Jan. 2006, IEEE, vol. 13, pp. 9-12.

Chaudhari et al., on Maximum Likelihood Estimation of Clock Offset and Skew in Networks With Exponential Delays, Apr. 2008, IEEE vol. 54, pp. 1685-1697.

Non-Final Office Action, U.S. Appl. No. 12/142,748, mailing date May 12, 2011, pp. 20.

Non-Final Office Action, U.S. Appl. No. 12/142,748, mailing date Mar. 1, 2012, pp. 15.

Non-Final Office Action, U.S. Appl. No. 12/142,748, mailing date Oct. 26, 2012, pp. 18.

Final Office Action, U.S. Appl. No. 12/142,748, mailing date Jun. 6, 2013 pp. 8.

Notice of Allowance, U.S. Appl. No. 12/142,748, mailing date Sep. 13, 2013, pp. 23.

CLOCK SYNCHRONIZATION USING CORRELATION EVENTS

CROSS REFERENCE TO RELATED APPLICATIONS

This application claims the benefit of and priority to U.S. patent application Ser. No. 12/142,748, entitled "Clock Synchronization Using Correlation Events", filed Jun. 19, 2008 by Erez Haba, the entire contents of which are expressly incorporated by reference.

BACKGROUND

Clocks are used in various computational and electronic devices in many different applications. Many functions use timestamps to log activities and may use clocks to schedule various functions for future execution. Many applications may use messaging to communicate between two different devices and to coordinate activities between the two devices.

Clocks on different devices may be subject to many different factors that may cause one clock to vary with respect to the other. Even between two identical devices, factors such as power level and temperature may cause one clock to vary with respect to another. Many clocks will inherently differ due to differences in the underlying circuitry, sensing techniques, or control circuitry.

Coordination of one clock with respect to another may be useful when analyzing the overall operation or performance of a system that has multiple devices.

SUMMARY

Two clocks may be synchronized by calculating skew and offset values that may be determined from several correlation events. A correlation event may be the passing of messages in both directions between the two devices. The skew and offset values may be used to determine the time of non-correlated events. The clock synchronization may be performed on a real time basis or may be performed on a post processing basis. One method for calculating the skew and offset may use inequalities within a solution space to refine a solution set with multiple sets of correlation events.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Correlated events may be used to determine and refine a set of constants that may describe one clock with respect to another. A correlated event is any event that correlates one clock with respect to the other. A clock on a remote device may be expressed using skew and offset constants as a linear variation of a baseline clock.

An example of a correlated event is a message that is passed from one device to another, and where a send time and received time may be included in the message or may be derived from a log file or some other source. The send time may use the sending device's clock and the received time may use the receiving device's clock. From the fact that the message originated at one device and was later received by the second device, the timestamp of the second device may be considered to be later than the timestamp of the sending device, setting up a first inequality. A return message may have a timestamp from the second device that is earlier than the timestamp of the first device, setting up a second inequality.

The two inequalities may be used to bound the set of solutions for an expression of the differences between a clock on the first device and a clock on the second device. As more and more correlated events are analyzed, the set of solutions may be further refined. The area of the bounded solutions may be used as an expression of accuracy for the set of solutions.

Clocks may be synchronized after the fact using log files or other records to express one clock with respect to another. In some embodiments, the synchronization analysis may be performed on an ongoing or real time basis.

Clocks may be used to create timestamps in various fashions. In some cases, an application layer service may include a timestamp on a message transmitted to another device. For example, an email application may include a timestamp in an email message. In another embodiment, a transport layer service may create and apply a timestamp. An example may be a TCP service that may timestamp outgoing packetized messages. In some instances, a timestamp may be applied at a network layer, such as an Internet Protocol service that may apply a timestamp to a message.

Some embodiments may analyze timestamps that are inherent in various processes that occur, such as a TCP service that timestamps messages. Other embodiments may create timestamps specifically for the correlation of one device's clock to another device's clock.

Some embodiments may include timestamps in a message, a message header, or some other message related area. Other embodiments may derive a timestamp from another source, such as a log file or other historical information.

One typical use for correlation messages is with a message passing interface. A message passing interface may be a communication protocol used with parallel computers. A message passing interface may be an application programmer interface that contains protocol and semantic specifications that may be used in high performance computing.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Figure 1:
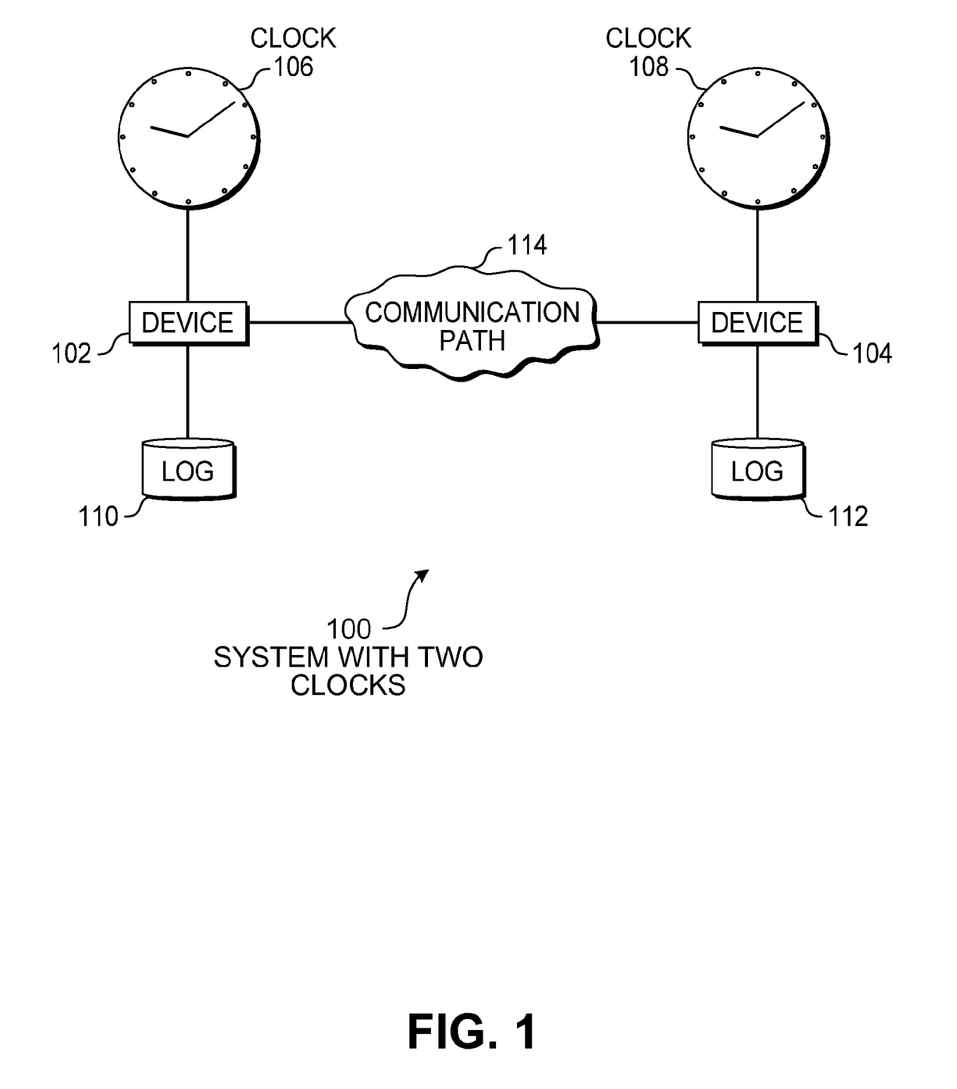
FIG. 1 is a diagram illustration of an embodiment showing a system with two clocks.

FIG. 1 is a diagram of an embodiment 100 showing a system with two clocks. Embodiment 100 is a simplified example showing devices that may be synchronized using correlated events.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 is a simplified illustration of devices 102 and 104 that may each have a clock 106 and 108, respectively. In many cases, the clocks 106 and 108 may drift with respect to each other. The difference between the two clocks may be a linear expression of skew and offset, and in many cases, the variation between the two clocks is a linear variation.

The devices 102 and 104 may be any set of devices that communicate or perform some action that may be used to correlate one device to another. In a typical usage, the devices 102 and 104 may pass messages back and forth through a communication path 114. The messages may be any type of communication where a send event may be timestamped by the sending device during a sending action and a receive event timestamped by a receiving device during a receiving action. In some embodiments, events may be analyzed after the fact and the timestamps may be determined by analyzing log files or other historical archives to determine when an event occurred. Some embodiment may have the send and receive event timestamps carried with the message.

A typical embodiment may be two devices that may communicate over some type of network. For example, two computing devices in a parallel computing cluster may communicate using a high speed communication backbone such as a blade computer chassis. In another example, a company or large enterprise may have servers located in distant divisions of the company, and the two servers may communicate over the Internet or other wide area network. In yet another example, a device may be a cellular telephone or other mobile device that may communicate with a server or control device through a wireless network.

When one clock is synchronized with another clock, one of the clocks is selected as a baseline or reference clock. A linear equation with constants for skew and offset may be created to convert time values expressed by the second clock to time values from the reference clock.

The synchronization may be performed in real time or may be performed by analyzing previous events. In a 'real time' system, each correlated event may be analyzed prior to other correlated events occurring. In a 'real time' system, the analysis and updating of the skew and offset constants may be performed in response to each correlated event.

For the purposes of this specification and claims, the term 'real time' may refer to any embodiment that performs an analysis of a correlated event prior to the occurrence of another correlated event. In a typical embodiment, an analysis system may detect that a correlation event may have occurred, then an analysis may be performed using data from the correlation event and the linear constants may be updated. Such an analysis may be an ongoing operation while correlation events occur.

In a non-real time embodiment, a set of correlated events may be derived from one or more log files 110 and 112 or other records. The correlation events may be identified and analyzed after all of the correlation events have occurred.

The log files 110 and 112 are illustrated as being connected to device 102 and 104, respectively. The log files may contain entries of various activities along with a timestamp of when those activities occurred. In many embodiments, the log files 110 and 112 may contain records of events that may be considered correlation events and other events that may not be considered correlation events.

A correlation event may be any event for which a timestamp may derived for an initiation event and a receive event. The initiation event timestamp may be with respect to a first clock and the receive event timestamp may be with respect to a second clock. The correlation event may have some sequential characteristics that enable some conclusions about the timestamps to be drawn. For example, a message sent from device 102 to device 104 implies that the sending timestamp occurred before the receiving timestamp. A return message would imply that the return sending timestamp occurred before the return receiving timestamp. By using the causality relationship between the timestamps of the two-way message pattern, the set of constants for a relationship may be bounded, as will be described below.

Throughout this specification, a correlation event is exemplified as a message or set of messages being passed between two devices. In other embodiments, different correlation events with different causality relationships may be used. A correlation event may be any event where a first device may sense effects of a second device's actions, whether or not the action of the second device was intended to be received by the first.

A timestamp may be created at the time a correlation event occurs or afterwards. In a message passing example, a timestamp may be applied when a message is sent or received. A timestamp may be determined after the fact by identifying a correlation event and determining when the event took place. The timestamp for the correlation event may be derived by analyzing a log file or other information that may contain a timestamp. Such analysis may be performed at any time after the correlation event occurred.

In many embodiments, each device 102 and 104 may keep its own log file of activities. The log files may contain entries for non-correlated events. After a set of linear correlation constants are determined, the timestamps for a non-correlated event may be converted to an equivalent time on the reference clock. In this manner, non-correlated events may be synchronized.

The clocks 106 and 108 may be related using a set of linear correlation constants. One set of such constants may be a skew constant and an offset constant. The skew constant may be a linear deviation between a reference clock and a second clock. The offset constant may be the difference between the two clocks. The skew constant may be multiplied to the second clock value and the offset may be added to the product.

Figure 2:
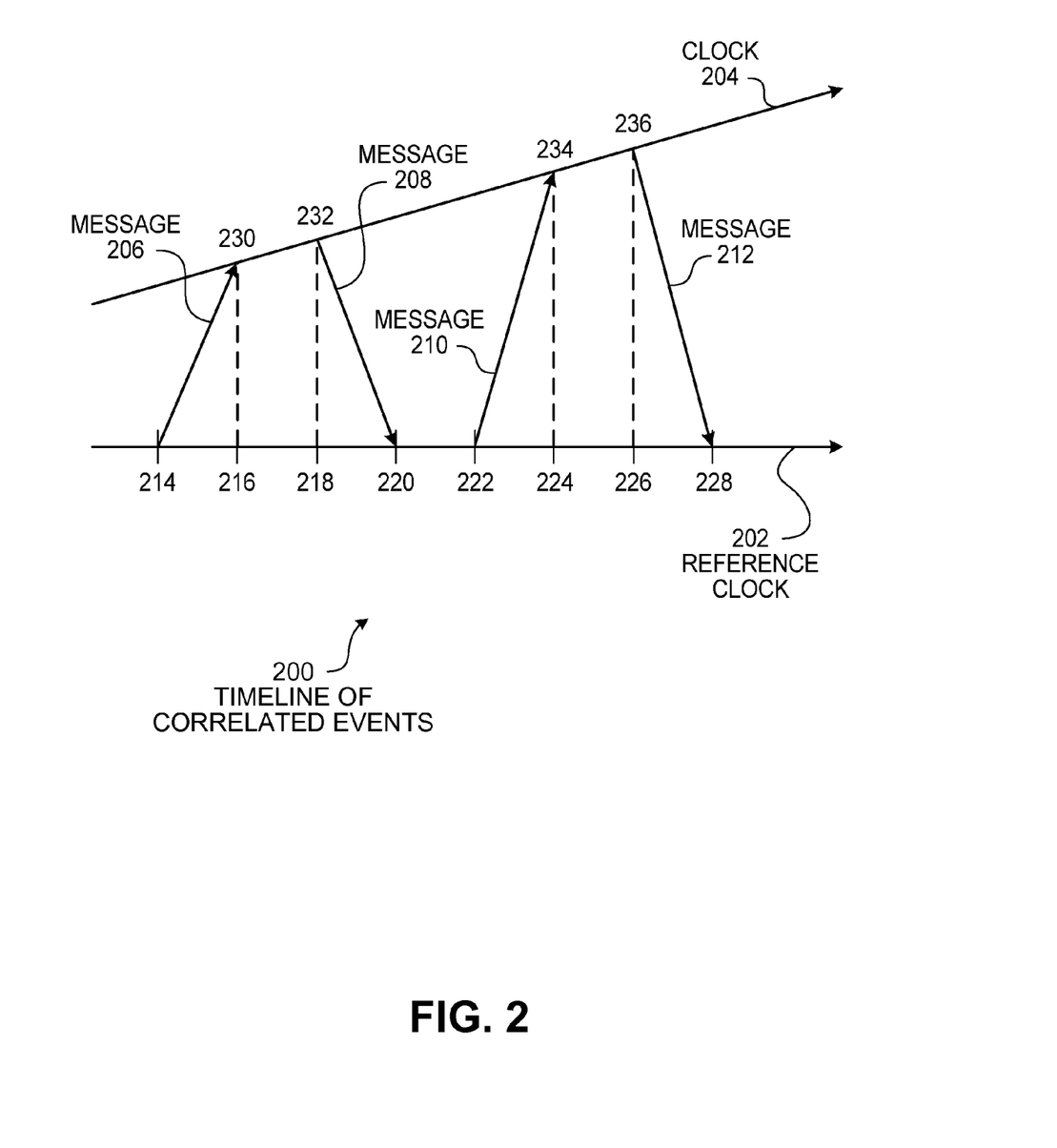
FIG. 2 is a diagram illustration of an example of a timeline showing correlated events.

FIG. 2 is a diagram illustration of an embodiment 200 showing a timeline of correlated events. Embodiment 200 is a pictorial graph showing correlation events as they occur with respect to two different clocks.

A reference clock 202 is shown as a horizontal line. The second clock 204 is illustrated as a non-parallel line offset from the reference clock 202. The reference clock 202 may be a clock for a first device and the second clock 204 may be a clock for a second device. The slope of the non-parallel line illustration of clock 204 illustrates the drift of the clock 204 with respect to the reference clock 202. The distance between the reference clock 202 and the second clock 204 illustrates the offset or time difference between the two clocks.

Message 206 illustrates a correlation event that begins at the first device and ends at the second device. Similarly, message 208 begins at the second device and ends at the first device. Message 210 begins at the first device and ends at the second device, and message 212 begins at the second device and ends at the first device.

The message 206 may begin at time 214 and end at time 216, using the reference clock 202. The end time 216 may correlate with time 230 of clock 204. Similarly, message 208 may begin at time 218 and end at time 220, with time 218 correlating with time 232 of clock 204. Likewise, message 210 may begin at time 222 and end at time 224 and message 212 may begin at time 226 and end at time 228. Times 224 and 226 may correspond with times 234 and 236 of clock 202.

Each message or correlation event may be expressed as an inequality. Because message 206 has a transmit time 214 on reference clock 202 and a receive time 230 on clock 204, the receive time 230 may be inferred to be after transmit time 214. The time difference between time 214 and 230 may not be known, since the time difference may be a function of communication delays, which may be variable.

When an outgoing message 206 and incoming message 208 are used, two inequalities may be used as two sided bounds for the possible sets of linear correlation constants. As more and more messages are analyzed, the bounds may be further limited and refined.

The value of the clock 204 may be expressed with respect to the reference clock 202 by an expression:

$$t_0 = (t_1 * a) + b$$

where, $t_0$ is the time expressed with respect to the reference time clock, $t_1$ is the time expressed with respect to the second clock, a is the skew constant, and b is the offset expressed as units of $t_0$ for the purposes of this illustration.

In the embodiment 200, the value of a−1 represents the slope of the second clock 204 with respect to the reference clock 202. If the slope or skew is greater than 1, the lines diverge as shown. If the slope is less than 1, the lines may converge and cross, then further diverge. The offset value is the distance between the two clocks when $t_1$ equals zero.

From message 206, the send time 214 is less than the receive time 230. This can be generalized as:

$$t_{send} < t_{receive}$$

when both values use the reference clock. Substituting the previous expression, $$t_{0send} < (t_{1receive} * a) + b$$

Similarly, $$t_{0receive} > (t_{1send} * a) + b$$

Expressed canonically, $$(+t_{1receive} * a) + b - t_{0send} > 0 \quad (1)$$

$$(-t_{1send} * a) + b - t_{0receive} > 0 \quad (2)$$

Using these expressions, line in a solution space of {a,b} may be created. Inequality (1) may limit the values of a and b to be greater than the line it draws. Inequality (2) may limit the values of a and b to be less than the line it draws. The intersection of these lines may bound the values of a and b in an upper and lower limit.

As more and more lines are evaluated, the bounds may be more tightly defined.

Figure 3:
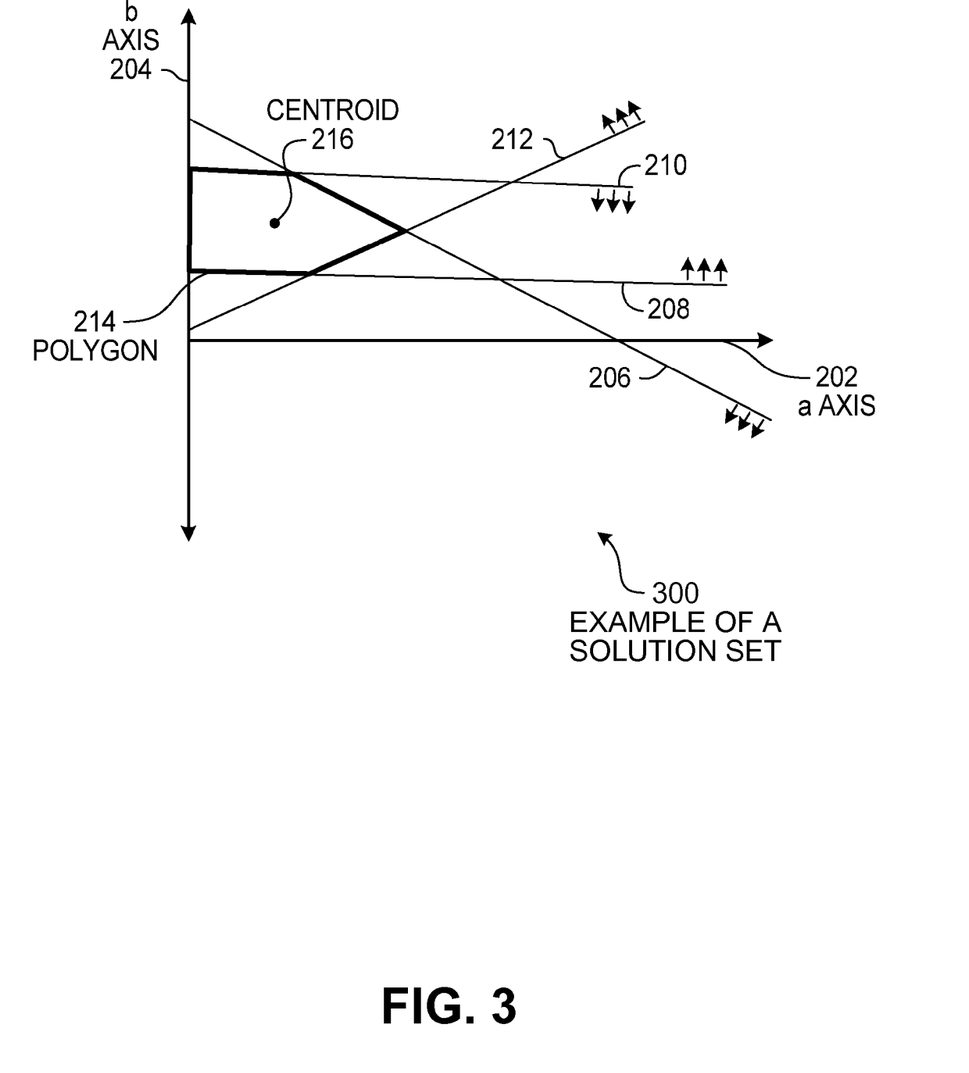
FIG. 3 is a graph illustration of an example of a solution set for a synchronization analysis.

FIG. 3 is a diagram illustration of an embodiment 300 showing an example of a solution set.

Embodiment 300 shows the solution with an a axis 202 and b axis 204. The a axis 202 is illustrated starting at zero because the value of a or skew is a positive number. A negative value of a would indicate that one clock is operating in reverse.

A first inequality may be illustrated by the line 206 that bounds the values of a and b on the upper side. Line 208 provides a lower bound to the values a and b. Similarly, line 210 provides a second upper bound and line 212 provides a second lower bound.

The lines 206, 208, 210, and 212 form a polygon 214 with the b axis. The polygon 214 may represent the {a,b} pairs that solve the four inequalities and would be acceptable values. One mechanism for selecting an acceptable value may be to calculate the centroid 216 of the polygon 214 as the representative value pair. The centroid 216 may also be referred to as the center of gravity or center of mass.

In some embodiments, the relative area represented by the polygon 214 may indicate the relative accuracy of the values selected. A first polygon that is much smaller than a second polygon may be considered to be more accurate than the answers derived from the second polygon.

Embodiment 300 illustrates how multiple correlation events may be combined to refine a solution set. As more and more correlation events are analyzed, the polygon 214 may be further bounded and reduced in size, limiting the area from which solution pairs {a,b} may be drawn.

Embodiment 300 also illustrates how send and receive messages may be used together to bound {a,b}. The lines 206 and 210 both indicate upper bounds of the solution set and may represent messages received from a second device to a reference device. The lines 208 and 212 may indicate lower bounds of the solution set and may represent messages sent from the reference device to the second device. By combining information from both the sent and received messages, a fully bounded polygon 214 may be created.

Figure 4:
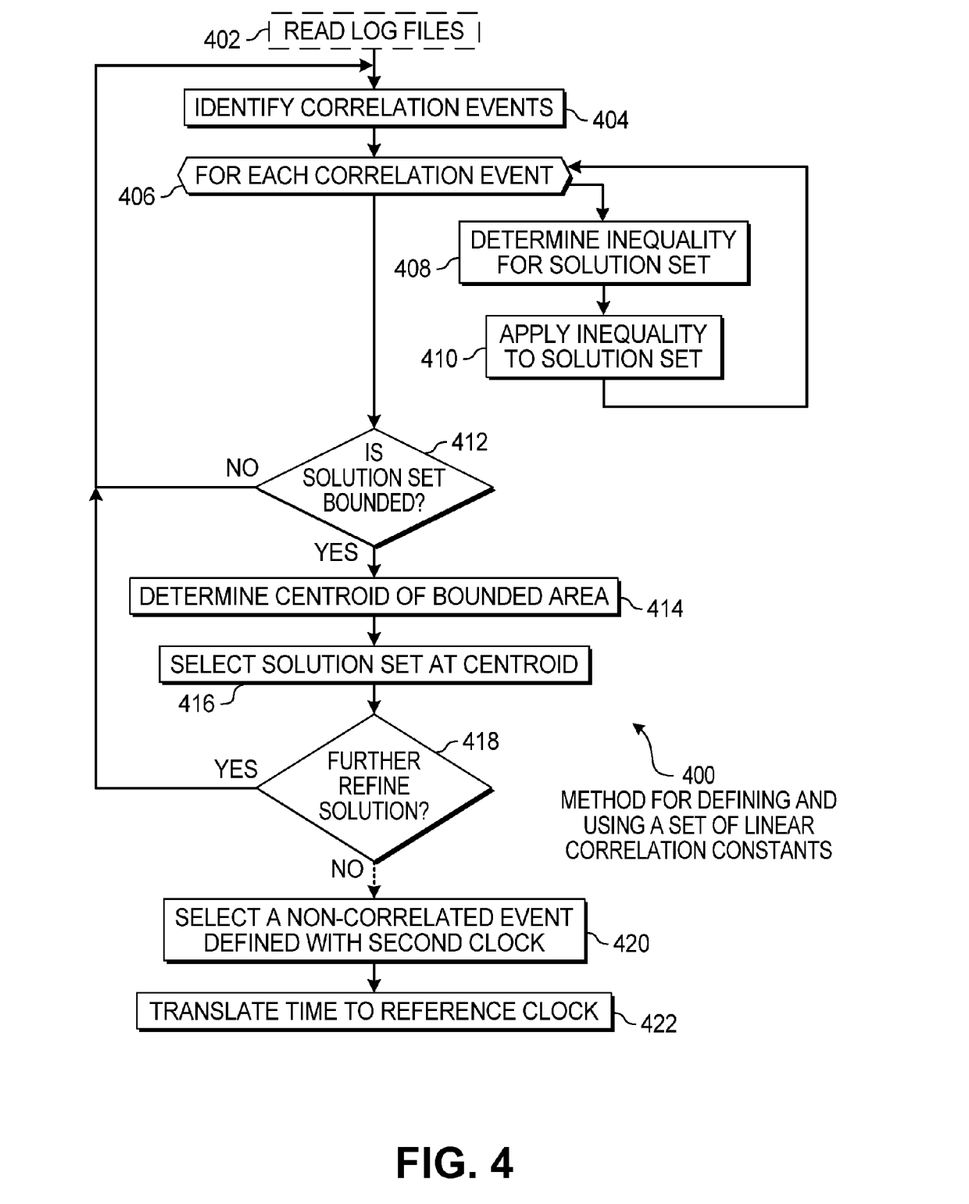
FIG. 4 is a flowchart illustration of an embodiment showing a method for defining and using a set of linear correlation constants.

FIG. 4 is a flowchart illustration of an embodiment 400 showing a method for defining and using a set of linear correlation constants. Embodiment 400 illustrates a method for identifying and analyzing correlation events and bounding a solution set. A set of linear correlation constants may be selected and used to translate events in a second clock to a reference clock.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 may use the basic methods described in the discussion of embodiments 200 and 300 to determine and use a set of linear correlation constants.

In some uses, embodiment 400 may be performed on a real time or ongoing basis. A real time basis may be any embodiment where an analysis of a correlation event may be performed prior to another correlation event. By contrast, a post processing embodiment may analyze correlation events after the correlation events have occurred.

In a typical post processing use, one or more log files may be read in block 402. In some cases, two or more log files may be combined in block 402. In some such cases, log files from the reference device and the second device may be combined and read in block 402.

Correlation events may be identified in block 404. In a post processing use, the log files may be analyzed to identify correlation events. In a typical correlation event, both the reference device and the second device may timestamp the event. From the type of event and the characteristics of the event, one of the timestamps may be determined to have happened before the other, setting up an inequality.

In the example of messaging in embodiment 200, the sending timestamp is considered to be prior to the receiving timestamp.

In a real time use of embodiment 400, a correlation event may be identified in block 404 as the event occurs or soon thereafter. For example, a daemon or other process may identify an incoming message from a second device and identify the correlation event in block 404.

In some embodiments, the correlation events of block 404 may be various events from which a correlation may be inferred. In other embodiments, the correlation events of block 404 may be specific events created for the purpose of correlating the clocks between the two devices.

The messaging example of embodiment 200 is an example of events from which correlation may be inferred. The messages sent in embodiment 200 may be any type of message and may be transmitted using many different mechanisms. For example, a correlation event may occur through the transmission of an email message. The email message may pass through several devices such as firewalls, network access points, message routers, email filters, and other devices which may create a delay between sending and receiving timestamps. The email message may be used as a correlation event.

In another example, a short User Datagram Protocol (UDP) message may be transmitted between two devices specifically to determine the clock difference between the two devices. The UDP message may be faster than the email message of the previous example and may avoid some communication delays and processing. Such a UDP message may be specifically used to create one or more correlation events in block 404.

For each correlation event in block 406, an inequality for the solution set may be created in block 408 and the inequality may be applied to the solution set in block 410. An example of the inequality and mapping the inequality to the solution set was described in the discussion of embodiments 200 and 300.

When embodiment 400 is performed in a post processing mode, several correlation events may be used to determine the clock difference between the two devices. The UDP message may be faster than the email message of the previous example and may avoid some communication delays and processing. Such a UDP message may be specifically used to create one or more correlation events in block 404.

For each correlation event in block 406, an inequality for the solution set may be created in block 408 and the inequality may be applied to the solution set in block 410. An example of the inequality and mapping the inequality to the solution set was described in the discussion of embodiments 200 and 300.

When embodiment 400 is performed in a post processing mode, several correlation events may be identified in block 404 and processed in block 406. In a real time mode, correlation events may be processed individually in block 406.

If the solution set is not bounded in block 412, the process may return to block 404 to identify and process additional correlation events. Such a determination may be useful in a real time use of embodiment 400.

If the solution set is bounded in block 412, the centroid of the bounded area may be determined in block 414 and the solution set may be selected from the centroid in block 416. Some embodiments may use other mechanisms to select a solution set pair {a,b} from the bounded area of the solution set.

If the solution may be further refined in block 418, the process may return to block 404 to identify and process additional correlation events. In a real time use of embodiment 400, the process may loop back to block 404 continually.

In some embodiments, the determination in block 418 may involve analyzing the bounded area of the solution set. If the bounded area is less than a predetermined area, the solution may be determined to be acceptable. If the bounded area is greater than a predetermined area, additional correlation events may be analyzed to further refine the bounded area.

After the linear correlation constants are determined in block 416, a non-correlated event defined with the second clock may be selected in block 420. The time from the event in block 420 may be converted to the reference time in block 422 using the linear correlation constants.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. At a device, a method implemented on a processor, said method comprising:
   identifying one or more correlation events occurring between a first device having a first clock and a second device having a second clock;
   determining that a solution set for an expression of the differences between said first clock and said second clock is not bounded, the solution set defining a linear relationship between said first clock and said second clock based on said one or more correlation events;
   in response to determining that said solution set is not bounded:
      identifying a further correlation event between said first device and said second device;
      calculating a linear inequality for said further correlation event; and
      including said linear inequality in said solution set;
   determining that said solution set including said linear inequality is a bounded solution set;
   identifying an additional event not being one of said one or more correlation events, said additional event having a first timestamp defined by said second clock; and
   using said bounded solution set to determine a second timestamp from said first timestamp, said second timestamp being with respect to said first clock.

2. The method of claim 1, wherein calculating a linear inequality for said further correlation event comprises using a set of linear correlation constants to calculate said linear inequality, said of linear correlation constants comprising a skew constant and an offset constant.

3. The method of claim 2, further comprising:
   determining a single point within said bounded solution set to represent said set of linear correlation constants, said single point determined based on said linear inequalities included in said solution set.

4. The method of claim 3, said single point being determined based on a centroid of a bounded area.

5. The method of claim 4 further comprising:
   determining an accuracy factor based on an area calculation of said bounded area.

6. The method of claim 1, at least one of said first timestamp and said second timestamp being determined by a transport layer service.

7. The method of claim 1, at least one of said first timestamp and said second timestamp being determined by a message passing interface.

8. The method of claim 1, said calculating being done by post processing.

9. The method of claim 8, said calculating comprising comparing a first log file from said first device and a second log file from said second device to identify at least one of said one or more correlation events.

10. The method of claim 1, further comprising:
    identifying another correlation event between said first device and said second device;
    calculating an additional linear inequality for said additional correlation event;
    including said additional linear inequality in said bounded solution set to refine said solution set; and
    using said refined solution set to improve the accuracy of determining said second timestamp from said first timestamp.

11. The method of claim 1, further comprising:
    calculating a further linear inequality based on said one or more correlation events, said linear inequality defining said linear relationship between said first clock and said second clock; and
    including said further linear inequality in said solution set.

12. A system comprising:
    a first clock;
    a first communication mechanism configured to send and receive messages using said first clock;
    a clock synchronization mechanism configured to synchronize a second clock from a second device with said first clock by a method comprising:
       determining that a solution set for an expression of the differences between said first clock and said second clock is not bounded, the solution set defining one or more linear relationships between said first clock and said second clock based on one or more messages sent to and from the first device;
       in response to determining that said solution set is not bounded:
          identifying a further message involving said second device;
          calculating a linear inequality for said further message; and
          including said linear inequality in said solution set;
       determining that the solution set including said linear inequality is a bounded solution set; and
       using said bounded solution set to estimate synchronization between said first clock and said second clock.

13. The system of claim 12, said clock synchronization mechanism further configured to calculate a set of linear correlation constants.

14. The system of claim 13, said clock synchronization mechanism further configured to determine a single point within a bounded area to represent said set of linear correlation constants.

15. The system of claim 12, wherein said method further comprises:
    identifying an additional message sent between said first device and said second device;
    calculating an additional linear inequality for said additional message;
    including said additional linear inequality in said bounded solution set to refine said bounded solution set; and
    using said refined solution set to more accurately estimate synchronization between said first clock and said second clock.

16. The system of claim 12, further comprising:
    calculating one or more linear inequalities based on said one or more messages, said one or more linear inequalities defining said one or more linear relationships between said first clock and said second clock; and including said one or more linear inequalities in said solution set.

17. A computer program product for use at a computer system, the computer program product comprising one or more computer storage devices having stored thereon computer-executable instructions that, when executed at a processor, cause the computer system to perform a method, including the following:

read a log file to identify one or more correlation events occurring between a first device having a first clock and a second device having a second clock;

determine that a solution set for an expression of the differences between said first clock and said second clock is not bounded, the solution set defining a linear relationship between said first clock and said second clock based on said one or more correlation events;

in response to determining that said solution set is not bounded:

read said log file to identify a further correlation event between said first device and said second device;

calculate a linear inequality based on said further correlation event; and         include said linear inequality in said solution set;

determining that said solution set including said linear inequality is a bounded solution set; and     using said bounded solution set to estimate synchronization between said first clock and said second clock.

18. The computer storage device of claim 17, wherein using said bounded solution set to estimate synchronization between said first clock and said second clock comprises determining a centroid for said bounded solution set.

19. The computer storage device of claim 17, wherein said method further comprises:

identifying an additional correlation event between said first device and said second device;

calculating an additional linear inequality for said additional correlation event;

including said additional linear inequality in said bounded solution set to refine said bounded solution set by reducing the area of said bounded solution set; and     using said refined solution set to more accurately estimate synchronization between said first clock and said second clock.

20. The computer storage device of claim 17, further comprising:

calculating a further linear inequality based on said first and second correlation events, said further linear inequality defining said linear relationship between said first clock and said second clock; and     including said further linear inequality in said solution set.

\* \* \* \* \*